(12) United States Patent
Banach et al.

(10) Patent No.: US 6,346,597 B1
(45) Date of Patent: Feb. 12, 2002

(54) METHOD FOR MAKING POLYESTER CARBONATES

(75) Inventors: Timothy Edward Banach, Scotia; Gregory Ronald Gillette, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/472,467

(22) Filed: Dec. 27, 1999

(51) Int. Cl.$^7$ ............................................... C08G 64/00
(52) U.S. Cl. ..................... 528/196; 528/176; 528/182; 528/185; 528/194; 528/295.3; 528/302; 528/307; 528/308; 528/308.6; 525/437; 525/439; 524/186; 524/401
(58) Field of Search ................... 528/176, 182, 528/185, 194, 196, 295.3, 302, 307, 308, 308.6; 525/437, 439; 524/186, 401

(56) References Cited

U.S. PATENT DOCUMENTS

| | | |
|---|---|---|
| 3,030,331 A | 4/1962 | Goldberg et al. |
| 3,169,121 A | 2/1965 | Goldberg et al. |
| 3,207,814 A | 9/1965 | Goldberg et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,487,896 A | 12/1984 | Mark et al. |
| 4,506,065 A | 3/1985 | Miller et al. |
| 4,983,706 A | 1/1991 | Fontana et al. |
| 5,606,007 A | 2/1997 | Sakashita et al. |

OTHER PUBLICATIONS

Kokai Patent Application No, HEI 4[1992]–345616–Mitsui Petrochemical Industries, Ltd. "Polycarbonate, Polycarbonate Composition, and Manufacturing Method Thereof". T. Sakashita pp. 1–60.

*Primary Examiner*—Samuel A. Acquah
(74) *Attorney, Agent, or Firm*—Bernadetta M. Bennett; Noreen J. Johnson

(57) ABSTRACT

A process for preparing a polyester carbonate is provided. The process comprises the steps of:

(I) reacting a diacid with a carbonic acid diester and a catalyst in the presence of a polycarbonate oligomer via melt condensation polymerization to form a pre-polymer; and (II) reacting the pre-polymer via solid state polymerization to form a polyester carbonate.

29 Claims, No Drawings

METHOD FOR MAKING POLYESTER CARBONATES

BACKGROUND OF THE INVENTION

The present invention relates to a method for making polyester carbonates. More particularly, the present invention relates to a melt condensation polymerization method followed by a solid state polymerization method to produce polyester carbonates.

Polyester carbonates and methods for their preparation have been studied extensively throughout the years. Polyester carbonates are typically thermoplastic resins that are clear and have high impact resistance. Due to their optical clarity and physical properties, polyester carbonates are used extensively in injection molding applications. The synthetic methods commonly used to made polyester carbonates are interfacial polymerization and melt condensation polymerization.

Interfacial polymerization is a well-known process. One such process is described in Fontana et al., U.S. Pat. No. 4,983,706 which discusses the reaction of an aromatic dihydroxy compound such as bisphenol-A with phosgene and a diacid to make polyester carbonates. The diacid is incorporated into the reaction mixture to produce a polyester carbonate with melt flow such that the polyester carbonate is suitable for purposes of injection molding. Melt flow can also be described in terms of viscosity. Although the polyester carbonate produced by the interfacial method provides excellent viscosity for injection molding purposes, particulate contamination may be a problem. Additionally, the above-mentioned process uses a hazardous chemical, phosgene, and an environmentally hazardous chlorinated solvent.

Melt condensation polymerization is a known synthetic process which often results in less particulates found in the polymer compared to the interfacial method. The melt condensation polymerization to prepare polyester carbonates does not involve hazardous chemicals. However, the polyester carbonates made by the melt condensation polymerization process often do not have the flow properties of polyester carbonates made by the interfacial method.

In order to improve the flow properties of polyester carbonates made by the melt condensation polymerization process, different methods have been studied. Sakashita et al. (Japanese Patent No. Hei 4[1992]-345616) discuss a method for preparing polyester carbonates which incorporates aliphatic diacids directly into a polyester carbonate using a melt polymerization process. Sakashita et al. are concerned with polyester carbonates which incorporate the aromatic dihydroxy compound, 2,2,2',2'-tetrahydro-3,3,3', 3'-tetramethyl-1,1'-spirobi [1 H-indene]-6,6'-diol, commonly known as SBI. In particular, Sakashita et al. are concerned with producing a polyester carbonate with a glass transition temperature greater than 150° C. In addition, this method involves the use of a cocatalyst, boric acid, to facilitate the incorporation of aliphatic diacids directly into polymer via a melt process.

New and more efficient methods for preparing polyester carbonates which can be used for injection molding purposes are constantly being sought.

BRIEF SUMMARY OF THE INVENTION

The present invention relates to a process for preparing a polyester carbonate. The process comprises the steps of:
(A) reacting a diacid with a carbonic acid diester and a catalyst in the presence of a polycarbonate oligomer via melt condensation polymerization to form a pre-polymer; and
(B) reacting the pre-polymer via solid state polymerization to form polyester carbonates.

DETAILED DESCRIPTION OF THE INVENTION

It has been found that the combination of the melt condensation polymerization method and solid state polymerization method can be used to form polyester carbonates containing thermally sensitive monomers. A diacid is incorporated into the polymer via a melt condensation polymerization reaction of diacid with a carbonic acid diester and a catalyst in the presence of polycarbonate oligomers to form a pre-polymer. The reaction of the carbonic acid diester and/or the polycarbonate oligomers with the diacid and catalyst forms a pre-polymer containing carboxylic diesters. "Pre-polymer" as used herein refers to the mixture of the reacted carbonic acid diester, diacid and catalyst in the presence of polycarbonate oligomers. Once the pre-polymer is formed, high molecular weight polyester carbonates are formed via a solid state polymerization method. "High molecular weight polyester carbonates" as used herein refers to polyester carbonates with a number average molecular weight greater than about 10,000 grams per mole.

Polyester carbonates of the present invention comprise polycarbonate structural units of formula I:

wherein D may be a divalent aromatic radical; and repeating or recurring units of the formula II:

wherein D has the meaning previously ascribed to it and $R^1$ is at least one divalent moiety selected from those of the formulae III, IV and V:

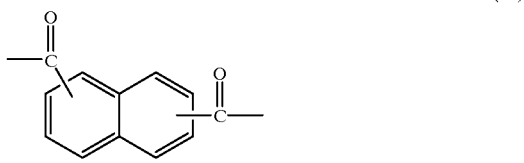

wherein X is a linear aliphatic group, branched aliphatic group, or cyclic aliphatic group. Linear and branched aliphatic groups are preferably those containing from about 2 to about 20 carbon atoms, and include as illustrative non-limiting examples ethyl, propyl, isopropyl, butyl, sec-butyl, pentyl, neopentyl, hexyl, octyl, decyl, and dodecyl. Cyclic aliphatic groups include cyclo- or bicycloalkyl radicals, preferably those containing from about 3 to about 12 ring carbon atoms with a total number of carbon atoms less than or equal to about 50. Some illustrative non-limiting examples of cyclic aliphatic groups include cyclobutyl, cyclopentyl, cyclohexyl, methylcyclohexyl, and cycloheptyl. Aliphatic groups also include aralkyl radicals containing from about 7 to about 14 carbon atoms; these include, but are not limited to, benzyl, phenylbutyl, phenylpropyl, and phenylethyl.

Illustrative polyester carbonates can be made by the method of the instant invention are disclosed in U.S. Pat. Nos. 3,030,331; 3,169,121; 3,207,814; 4,238,596; 4,238,597; 4,487,896; 4,506,065, and in copending application Ser. No. 09/181,902, filed Oct. 29, 1998, and assigned to the same assignee as the instant application.

Suitable aromatic dihydroxy compounds for preparing polyester carbonates and polycarbonate oligomers include those represented by the formula VI:

$$\text{HO—D—OH} \quad (VI)$$

wherein D may be a divalent aromatic radical defined in formula I. At least about 50 percent of the total number of D groups are aromatic organic radicals and the balance thereof are aliphatic, alicyclic, or aromatic organic radicals. Preferably, D has the structure of formula VII:

(VII)

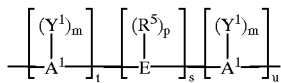

wherein $A^1$ represents an aromatic group such as phenylene, biphenylene, and naphthylene. E may be an alkylene or alkylidene group such as methylene, ethylene, ethylidene, propylene, propylidene, isopropylidene, butylene, butylidene, isobutylidene, amylene, amylidene, and isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage such as silane or siloxy; or a sulfur-containing linkage such as sulfide, sulfoxide, or sulfone; or a phosphorus-containing linkage such as phosphinyl or phosphonyl. In addition, E may be a cycloaliphatic group, such as cyclopentylidene, cyclohexylidene, 3,3,5-trimethylcyclohexylidene, methylcyclo-hexylidene, 2-[2.2.1]-bicycloheptylidene, neopentylidene, cyclopentadecylidene, cyclododecylidene, and adamantylidene. $R^5$ represents hydrogen or a monovalent hydrocarbon group such as alkyl, aryl, aralkyl, alkaryl, cycloalkyl, or bicycloalkyl. The term "alkyl" is intended to designate both straight-chain alkyl and branched alkyl radicals. Straight-chain and branched alkyl radicals are preferably those containing from about 2 to about 20 carbon atoms, and include as illustrative non-limiting examples ethyl, propyl, isopropyl, butyl, tertiary-butyl, pentyl, neopentyl, hexyl, octyl, decyl, and dodecyl. Aryl radicals include phenyl and tolyl. Cyclo- or bicycloalkyl radicals represented are preferably those containing from about 3 to about 12 ring carbon atoms with a total number of carbon atoms less than or equal to about 50. Some illustrative non-limiting examples of cycloalkyl radicals include cyclobutyl, cyclopentyl, cyclohexyl, methylcyclohexyl, and cycloheptyl. Preferred aralkyl radicals are those containing from about 7 to about 14 carbon atoms; these include, but are not limited to, benzyl, phenylbutyl, phenylpropyl, and phenylethyl.

$Y^1$ may be a halogen, such as fluorine, bromine, chlorine, and iodine; a tertiary nitrogen group such as dimethylamino; a group such as R above, or an alkoxy group such as OR wherein R is an alkyl or aryl group. It is highly preferred that $Y^1$ be inert to and unaffected by the reactants and reaction conditions used to prepare the polyester carbonate. The letter "m" represents any integer from and including zero through the number of positions on Al available for substitution; "p" represents an integer from and including zero through the number of positions on E available for substitution; "t" represents an integer equal to at least one; "s" is either zero or one; and "u" represents any integer including zero.

In the aromatic dihydroxy compound in which D is represented by formula VII above, when more than one Y substituent is present, they may be the same or different. For example, the $Y^1$ substituent may be a combination of different halogens. The $R^5$ substituent may also be the same or different if more than one $R^5$ substituent is present. Where "s" is zero in formula VII and "u" is not zero, the aromatic rings are directly joined with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of aromatic dihydroxy compounds of formula VI include the dihydroxy-substituted aromatic hydrocarbons disclosed by genus or species in U.S. Pat. No. 4,217,438. Some preferred examples of aromatic dihydroxy compounds include 4,4'-(3,3,5-trimethylcyclohexylidene)-diphenol; 2,2-bis(4-hydroxyphenyl)propane (commonly known as bisphenol A); 2,2-bis(4-hydroxy-3,5-dimethylphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl) cyclohexylmethane; 2,2-bis(4-hydroxyphenyl)-1-phenylpropane; 2,2,2',2'-tetrahydro-3,3,3',3'-tetramethyl-1,1'-spirobi[1H-indene]-6,6'-diol (SBI); 2,2-bis(4-hydroxy-3-methylphenyl)propane (commonly known as DMBPC); resorcinol; and $C_{1-3}$ alkyl-substituted resorcinols.

Most typically, 2,2-bis(4-hydroxyphenyl)propane is the preferred aromatic dihydroxy compound. Combinations of aromatic dihydroxy compounds can also be used in the method of the present invention.

Diacids are of the general formula $R^3(COOH)_2$ wherein $R^3$ is an aryl group or alkyl group wherein the alkyl group is an alkylene or alkylidene group derived from straight-chained or branched alkyl groups as defined above. Examples of diacids include, but are not limited to, aliphatic diacids, aromatic diacids, or combinations thereof. Examples of aliphatic diacids include adipic acid, sebacic acid, dodecanedioic acid, $C_{19}$ diacid, $C_{36}$ dimer diacid; examples of aromatic diacids include isophthalic acid, terephthalic acid and 2,6-napthalenedicarboxylic acid.

Typical catalysts employed in the melt condensation polymerization process include, but are not limited to, alkali metal compounds, alkaline earth metal compounds, quaternary ammonium compounds and combinations thereof.

Useful alkali metal compounds as catalysts include, sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenolate, sodium benzoate, potassium benzoate, lithium benzoate, disodium hydrogenphosphate, dipotassium hydrogenphosphate, dilithium hydrogenphosphate, disodium, dipotassium and dilithium salts of bisphenol A and sodium, potassium, and lithium salts of phenol, or substituted phenols, particularly alkyl substituted phenols.

Useful alkaline earth metal compounds as catalysts include calcium hydroxide, barium hydroxide, magnesium hydroxide, strontium hydroxide, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Useful quaternary ammonium compounds as catalysts include tetraalkylammonium compounds such as tetramethylammonium hydroxide and tetraethylammonium hydroxide.

Preferred catalysts include tetramethylammonium hydroxide, sodium hydroxide, and mixtures thereof.

Carbonic acid diesters are of the general formula, $R_2(CO_3)$ wherein R is an alkyl or aryl group. Typical examples of carbonic acid diesters include, but are not limited to, diphenyl carbonate, ditolyl carbonate, bis (chlorophenyl) carbonate, bis(m-cresyl) carbonate, dinaphthyl carbonate, diethyl carbonate, dimethyl carbonate, dibutyl carbonate, dicyclohexyl carbonate and combinations thereof. The carbonic acid diester most typically used is diphenyl carbonate.

In order to form polyester carbonates, two moles of the carbonic acid diester are needed for each mole of diacid although slight variations therefrom, up to about 2 mole percent, can be tolerated in certain instances. Preferably, the mole ratio of carbonic acid diester to diacid is about 2 to 1. Catalyst is present in a range between about $10^{-8}$ moles and about $10^{-3}$ moles per mole of aromatic dihydroxy compound. In another embodiment, the catalyst is present in a range between about $10^{-7}$ and about $10^{-5}$ moles per mole of aromatic dihydroxy compound.

Reaction may occur in either batch mode, continuous mode, or semi-continuous mode. With a batch mode reaction, for instance, all of the reactants are combined and reacted until most of the reactants are consumed. In order to add reactants, the reaction is typically stopped. With continuous or semi-continuous conditions, the reaction does not necessarily have to be stopped in order to add more reactants. Most typically, reaction occurs in batch mode.

The reaction of the diacid with the carbonic acid diester and catalyst occurs in the presence of polycarbonate oligomers, preferably low molecular weight polycarbonate oligomers. Polycarbonate oligomers are typically synthesized from the melt condensation polymerization of at least one aromatic dihydroxy compound, carbonic acid diester, and catalyst. The polycarbonate oligomers formed preferably have at least one hydroxy terminated end group and alternatively, have both chain ends terminated with a hydroxy group. The molecular weight range for the polycarbonate oligomers that are used depends on the pressure and temperature conditions employed in synthesis. Typically, "oligomers" as used herein refers to low molecular weight polycarbonate wherein the number average molecular weight is in a range between about 2000 grams per mole and about 6000 grams per mole.

Once the polycarbonate oligomers have been formed, carbonic acid diester, catalyst and diacid are added to the polycarbonate oligomers. The reaction of the carbonic acid diester, catalyst and diacid occurs in the presence of the polycarbonate oligomers at a temperature in a range between about 180° C. and about 270° C. Commonly, the reaction is carried out at a temperature in a range between about 220° C. and about 260° C. More commonly, the reaction is carried out at a temperature in a range between about 230° C. and about 250° C. The pressure in the reaction vessel is in a range between atmospheric pressure and about 200 torr. Preferably, there is substantially complete conversion of the carbonic acid diester and diacid to a new diester.

The reaction of a diacid with a carbonic acid diester and a catalyst produces a diester compound. This reaction is referred to as an esterification process. The reaction conditions may be modified to promote substantially complete conversion of the diacid and carbonic acid diester to a carboxylic diester compound. "Substantially complete conversion" as used herein refers to the reaction of a diacid and carbonic acid diester wherein at least 95% of the diacid and carbonic acid diester react to form a diester compound. In order to monitor conversion of the diacid, proton nuclear magnetic resonance spectroscopy may be used.

Once the carbonic acid diester, catalyst and diacid have been reacted under the reaction conditions to form a carboxylic diester in the presence of polycarbonate oligomers, a solid-state polymerization process is used to complete the synthesis of the polyester carbonates. The first step of the solid state polymerization process involves the isolation of the pre-polymer which is typically pelletized. Once the pre-polymer has been isolated, the pre-polymer is crystallized. Crystallization of the pre-polymer is typically done using either a solvent method or a thermal method. Typically, the crystallized pre-polymer has a crystallinity in a range between about 5% and about 55% and more commonly, in a range between about 10% and about 45% as determined by the heat of fusion from differential scanning calorimetry (DSC). The solvent method and thermal method for crystallizing a pre-polymer is disclosed, for example, in U.S. Pat. No. 4,948,871.

The solvent method used to crystallize the pre-polymer involves exposing the pre-polymer to a solvent. Solvents include, for example, aliphatic halogenated hydrocarbons, such as chloromethane, methylene chloride, chloroform, carbon tetrachloride, chloroethane, dichloroethane, trichloroethane, trichloroethylene, and tetrachloroethane; halogenated aromatic hydrocarbons, such as chlorobenzene and dichlorobenzene; aromatic hydrocarbons such as benzene, toluene, and xylene; ethers such as tetrahydrofuran and dioxane; esters such as methyl acetate and ethyl acetate; alcohols such as methanol, ethanol, isopropanol, 1-butanol, 2-butanol, and 3-pentanol; and ketones such as acetone and methyl ethyl ketone. The proportion of solvent is typically in a range between about 1 and about 100 and preferably, in a range between about 2 and about 50 parts by weight per hundred part of pre-polymer. Typical temperatures for solvent treatment are in a range between about –10° C. and about 200° C. Once the pre-polymer is exposed to solvent, the pre-polymer is crystallized by known methods such as removing the solvent by evaporation or adding another solvent in which the pre-polymer is not soluble.

The thermal method used to crystallize the pre-polymer involves heating the pre-polymer to a specific temperature range. The temperature the pre-polymer is heated to is typically higher than the glass transition temperature ($T_g$) of the pre-polymer yet lower than the melt temperature ($T_m$) of the pre-polymer. Maintaining a temperature in this range prevents the pre-polymer from agglomerating.

Once the pre-polymer is crystallized, the reactor is commonly heated to a temperature in a range between about 1° C. and about 50° C. below the melting temperature of the pre-polymer, more commonly in a range between about 5° C. and about 25° C. below the melting temperature of the pre-polymer and most commonly in a range between about 10° C. and about 20° C. below the melting temperature of the pre-polymer. The pressure is typically in a range between about atmospheric pressure and about 1 torr. Byproducts, such as phenol, are typically removed from the reaction system by applying vacuum or passing an inert gas through the reactor. Typical inert gases include nitrogen, argon, and helium. Nitrogen is commonly used.

The reaction of the carbonic acid diester, catalyst and diacid in the presence of polycarbonate oligomers has been found to be an efficient and effective method to fully incorporate diacids into polycarbonate to form polyester carbonates. In addition, the sequential step of solid state polymerization of the pre-polymer produces polyester carbonates which contain thermally sensitive monomers.

Polyester carbonates obtained by the present invention can be used in a wide variety of applications for example, for optical data storage components such as compact discs and cartridges. Polyester carbonates may also be used for indoor and outdoor lighting lenses, housings and covers. Polyester carbonates are also used in computers and in the telecommunication industry for cases. In addition, polyester carbonates are used for containers, optical lenses and eyewear.

In order that those skilled in the art will be better able to practice the invention, the following examples are given by way of illustration and not by way of limitation.

EXAMPLE 1

A glass tube (2.5 centimeter×20 centimeter) was pretreated with a 3 molar solution of hydrochloric acid and rinsed in de-ionized water. The glass tube when then charged with diphenyl carbonate (0.986 grams), adipic acid (0.575 grams), polycarbonate oligomer (11.823 grams with a number average molecular weight of 6,000), sodium hydroxide (1.97 microliters of a 1 millimolar solution) and tetramethylammonium hydroxide (56.16 microliters of a 0.22 molar solution). A stirrer was added and the tube was fitted to a melt reaction system. The tube was evacuated and refilled with nitrogen gas three times then heated to 240° C. in a salt bath. After the contents were allowed to melt, the mixture was stirred at 60 rpm. After 120 minutes, the reaction was poured out and crushed. The sample was then crystallized by heating to 100° C. in 3-pentanol for one hour, removed from the 3-pentanol by filtration and dried in a vacuum oven. The polymer was then charged to a reactor for solid state polymerization, wherein it was heated in a 240° C. salt bath under a 2 standard cubic feet per minute flow of nitrogen.

After 3.5 hours, the resulting polyester carbonate formed had a $T_g$ of 130° C. as measured by differential scanning calorimetry (DSC), a molecular weight of 26,000 as measured by gel permeation chromatography (GPC) in chloroform against a polystyrene standard and 5.1 mol% adipic ester as determined by proton nuclear magnetic spectroscopy.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A process for preparing polyester carbonates comprising the steps of:
   (A) reacting a diacid with a carbonic acid diester and a catalyst in the presence of a polycarbonate oligomer via melt condensation polymerization to form a pre-polymer; and
   (B) reacting the pre-polymer via solid state polymerization to form a polyester carbonate.

2. The process in accordance with claim 1, wherein the diacid is selected from the group consisting of adipic acid, sebacic acid, dodecanedioic acid, $C_{19}$ dimer diacid, $C_{36}$ dimer diacid, terephthalic acid, isophthalic acid, 2,6-napthalenedicarboxylic acid and combinations thereof.

3. The process in accordance with claim 2, wherein the diacid comprises adipic acid.

4. The process in accordance with claim 1, wherein the polycarbonate oligomer comprises dihydroxy aromatic hydrocarbons.

5. The process in accordance with claim 4, wherein the polycarbonate oligomer comprises 2,2-bis(4-hydroxyphenyl)propane.

6. The process in accordance with claim 1, wherein the catalyst comprises a quaternary ammonium compound, an alkali metal compound, an alkaline earth metal compound, or combinations thereof.

7. The process in accordance with claim 6, wherein the catalyst is tetramethylammonium hydroxide, sodium hydroxide or mixtures thereof.

8. The process in accordance with claim 1, wherein the carbonic acid diester is selected from the group consisting of diphenyl carbonate, ditolyl carbonate, bis(chlorophenyl) carbonate, bis(m-cresyl) carbonate, dinaphthyl carbonate, diethyl carbonate, dimethyl carbonate, dibutyl carbonate, dicyclohexyl carbonate and combinations thereof.

9. The process in accordance with claim 8, wherein the carbonic acid diester comprises diphenyl carbonate.

10. The process in accordance with claim 1, wherein the carbonic acid diester to diacid is present in a ratio of about 2:1.

11. The process in accordance with claim 1, wherein the catalyst is present in a ratio between about $10^{-8}$ moles and about $10^{-3}$ moles per moles of aromatic dihydroxy compound.

12. The process in accordance with claim 11, wherein the catalyst is present in a ratio between about $10^{-7}$ moles and about $10^{-5}$ moles per moles of aromatic dihydroxy compound.

13. The process in accordance with claim 1, wherein step A occurs at a temperature in a range between about 180° C. and about 270° C.

14. The process in accordance with claim 13, wherein step A occurs at a temperature in a range between about 220° C. and about 260° C.

15. The process in accordance with claim 14, wherein step A occurs at a temperature in a range between about 230° C. and about 250° C.

16. The process in accordance with claim 1, wherein step A occurs at a pressure in a range between about atmospheric pressure and about 200 torr.

17. The process in accordance with claim 1, wherein step B occurs at a temperature in a range between about 1° C. and about 50° C. below the melting temperature of the pre-polymer.

18. The process in accordance with claim 17, wherein step B occurs at a temperature in a range between about 5° C. and about 25° C. below the melting temperature of the pre-polymer.

19. The process in accordance with claim 1, wherein step B occurs at a temperature in a range between about 10° C. and about 20° C. below the melting temperature of the pre-polymer.

20. The process in accordance with claim 1, wherein step B further comprises the step of crystallizing the pre-polymer.

21. The process in accordance with claim 20, wherein the pre-polymer is crystallized using a solvent method.

22. The process in accordance with claim 21, wherein the solvent is selected from the group consisting of aliphatic halogenated hydrocarbons, halogenated aromatic hydrocarbons, aromatic hydrocarbons, ethers, esters, alcohols and ketones.

23. The process in accordance with claim 22, wherein the solvent comprises 3-pentanol.

24. The process in accordance with claim 20, wherein the pre-polymer is crystallized using a thermal method.

25. The process in accordance with claim 24, wherein the pre-polymer is heated to a temperature higher than the glass transition temperature of the pre-polymer and lower than the melt temperature of the pre-polymer.

26. A process for preparing polyester carbonates comprising the steps of:

(C) reacting adipic acid with diphenyl carbonate, tetramethyl ammonium hydroxide and sodium hydroxide in the presence of 2,2-bis(4-hydroxyphenyl)propane polycarbonate oligomers at a temperature in a range between about 230° C. and about 250° C. via melt condensation polymerization to form a pre-polymer;

(D) crystallizing the pre-polymer via a thermal method wherein the pre-polymer is heated to a temperature higher than the glass transition temperature of the pre-polymer and lower than the melt temperature of the pre-polymer to form a crystallized pre-polymer; and (E) heating the crystallized pre-polymer to a temperature in a range between about 10° C. and about 20° C. below the melting temperature of the pre-polymer to form the polyester carbonate.

27. The process of claim 26 further comprising the step of recovering the polyester carbonate.

28. A process for preparing polyester carbonates wherein the process comprises the steps of:

(F) reacting adipic acid with diphenyl carbonate, tetramethyl ammonium hydroxide and sodium hydroxide in the presence of a 2,2-bis(4-hydroxyphenyl)propane oligomers at a temperature in a range between about 230° C. and about 250° C. via melt condensation polymerization to form a pre-polymer;

(G) crystallizing the pre-polymer via a solvent method wherein the pre-polymer is exposed to 3-pentanol at a temperature in a range between about −10° C. and about 200° C. to form a crystallized pre-polymer; and (H) heating the crystallized pre-polymer to a temperature in a range between about 10° C. and about 20° C. below the melting temperature of the prepolymer to form the polyester carbonate.

29. The process of claim 28 further comprising the step of recovering the polyester carbonate.

* * * * *